United States Patent [19]

Clark

[11] Patent Number: 4,596,399
[45] Date of Patent: Jun. 24, 1986

[54] VEHICLE TO VEHICLE COUPLING

[76] Inventor: Randall N. Clark, Union, Me. 04862

[21] Appl. No.: 539,268

[22] Filed: Oct. 5, 1983

[51] Int. Cl.$^4$ .............................................. B62D 53/06
[52] U.S. Cl. .............................. 280/492; 280/423 A;
280/485
[58] Field of Search ................... 280/492, 476 R, 483,
280/484, 485, 493, 423 A

[56] References Cited

U.S. PATENT DOCUMENTS 3,525,539 8/1970 Illar ..................................... 280/492
4,397,474 8/1983 Mett et al. ...................... 280/423 A Primary Examiner—John J. Love
Assistant Examiner—Donn McGiehan

[57] ABSTRACT

A coupling for use between first and second vehicles has a series of sections joined in line by pivotal connections. One section is a draw bar anchored to the frame of the first vehicle, another is a tow unit connected by transverse pivots to the second vehicle. A first intermediate section has a pivoted connection with the draw bar section with the connection having a transverse pivot axis and a fifth wheel connection with a second intermediate section. The second intermediate section has a connection with the tow bar section that permits limited turning on a lengthwise axis between them and, accordingly permitting limited roll between the two vehicles when the coupling is in use. The coupling is described with particular reference to uses with first and second trailers.

7 Claims, 7 Drawing Figures

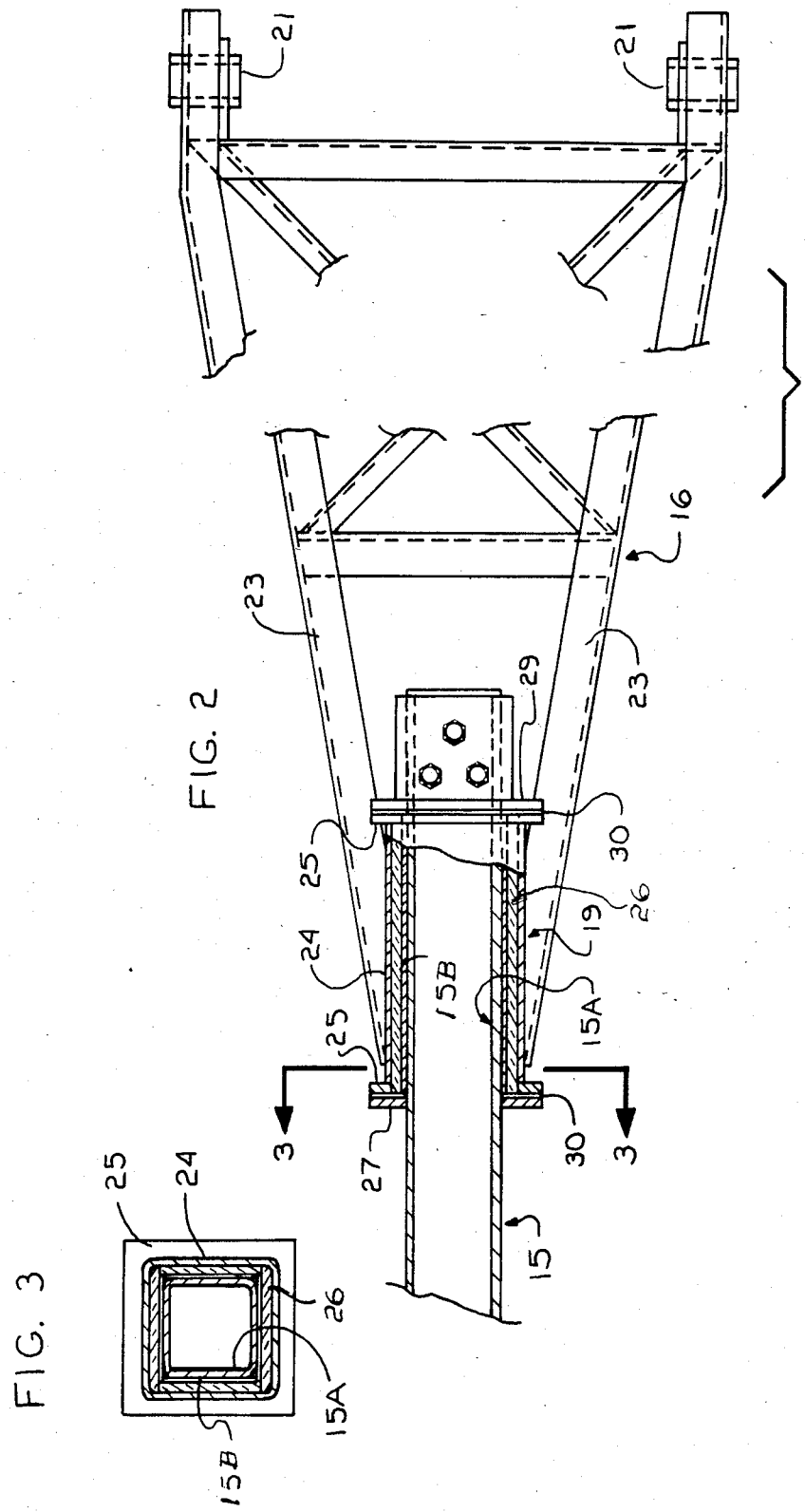

1

VEHICLE TO VEHICLE COUPLING

BACKGROUND REFERENCES

U.S. Pat. No. 2,435,383
U.S. Pat. No. 2,837,349
U.S. Pat. No. 3,912,300
U.S. Pat. No. 4,079,955
U.S. Pat. No. 4,262,920
U.S. Pat. No. 4,273,353
U.S. Pat. No. 4,353,572

BACKGROUND OF THE INVENTION

The use of tandem trailers has increased considerably during the last few years and little difficulty has been experienced where the roads over which they are hauled are sufficiently wide, free of sharp curves, and even surfaced.

One field of use where tandem trailers can be used to advantage is in the hauling of tree length logs from the area in which they were harvested to the mill or mills of a paper company. The distances over which the logs are hauled are substantial and the roads, at least those near the harvesting area, are private roads and while capable of supporting heavy loads are narrow, dusty, often with many curves, and with surfaces so uneven that conventional connections cannot be safely used because roll, i.e., the tilting of one trailer relative to the other, cannot be accommodated thereby.

THE PRESENT INVENTION

The general objective of the present invention is to provide a coupling between a first or lead vehicle and a second or rear vehicle that enables limited roll between the trailers to be safely accommodated.

This objective is attained with an in line coupling including first and second rigid sections and first and second connecting means of which one is a fifth wheel and the other a unit operable to permit limited roll between the two vehicles with one end of the coupling connected or connectable to the first vehicle and the other end connected or connectable to the second vehicle.

Each of the first and second rigid sections, at least when the coupling is installed, has an additional rigid section by which it is connected to the appropriate one of the vehicles. In the embodiment of the invention illustrated by the drawings, the additional section of the second rigid section is connected to the trailing vehicle and is sometimes referred to herein as a tow member while the additional section of the first rigid section is connected to the leading vehicle and is sometimes referred to as a draw bar and is connected to the first rigid section by a fifth wheel.

For most uses, particularly when the second vehicle is a trailer having a dolly to which the coupling is to be connected, the third section is pivotally connected to the dolly with the pivot axis transverse and the fourth section is pivotably connected to the first section with its pivot axis also transverse.

One important objective of the invention is to provide a simple but rugged roll control unit. This objective is attained by utilizing a first member, in practice an end portion of one of the sections connected by that unit with the end portion extending freely through a housing anchored to the proximate end of the other section and having end flanges. The end portion has flanges between which the end flanges of the housing are confined to prevent relative endwise movement between the housing and end portion.

The cross sectional sizes and shapes of the end portion and housing are such that only the limited turning between them is possible on an axis extending lengthwise of the coupling that is necessary to permit the required limited roll between the two vehicles. In practice, resiliently yieldable means are provided between the housing and the rear portion and anti-friction means are confined between each of the flanges of the housing and the corresponding one of those of the rear portion. In practice, layers of Teflon or the equivalent are employed for that purpose so that the unit is sealed against dirt.

Other objectives of the invention and the manner in which they are attained will be apparent from the following description of the preferred embodiment and the appended claims.

PRIOR ART STATEMENT

No coupling is known to applicant in which the connections providing the necessary transverse and vertical pivot axes and a unit permitting limited roll between coupled trailers are arranged in line.

U.S. Pat. No. 2,837,349 to Hawk provided a hitch connecting the two sections of an articulated vehicle. The structure included a king pin mounted on a horizontal hitch and transverse members engageable with stop blocks mounted on the tractor section to limit the extent to which the interconnected sections could roll or tilt relative to each other.

U.S. patents which disclose structures providing for unlimited roll or tilting between connected units are U.S. Pat. Nos. 2,435,383 to Chafin, 4,079,955 to Thorpe et al and 4,273,353 to Holmes and 4,353,572 to McCain. The patent to Thorpe et al and the patent to McCain also including means to prevent roll.

U.S. Pat. No. 4,262,920 to Mettetal provided connections between first and second trailers with one connection between the frame of the first trailer and the dolly of the second trailer and another connection between the frames of the two trailers operable to prevent roll and including a fixed rectangular box in which a rectangular box beam was slidable.

BRIEF DESCRIPTION OF THE DRAWINGS

The accompanying drawings illustrate a preferred embodiment of a draw bar in accordance with the invention for interconnecting two trailers with:

FIG. 2 is a partly sectioned, plan view of the roll control unit;

FIG. 3 is a section taken approximately along the indicated line 3—3 of FIG. 2;

THE PREFERRED EMBODIMENT OF THE INVENTION

Figure 1:
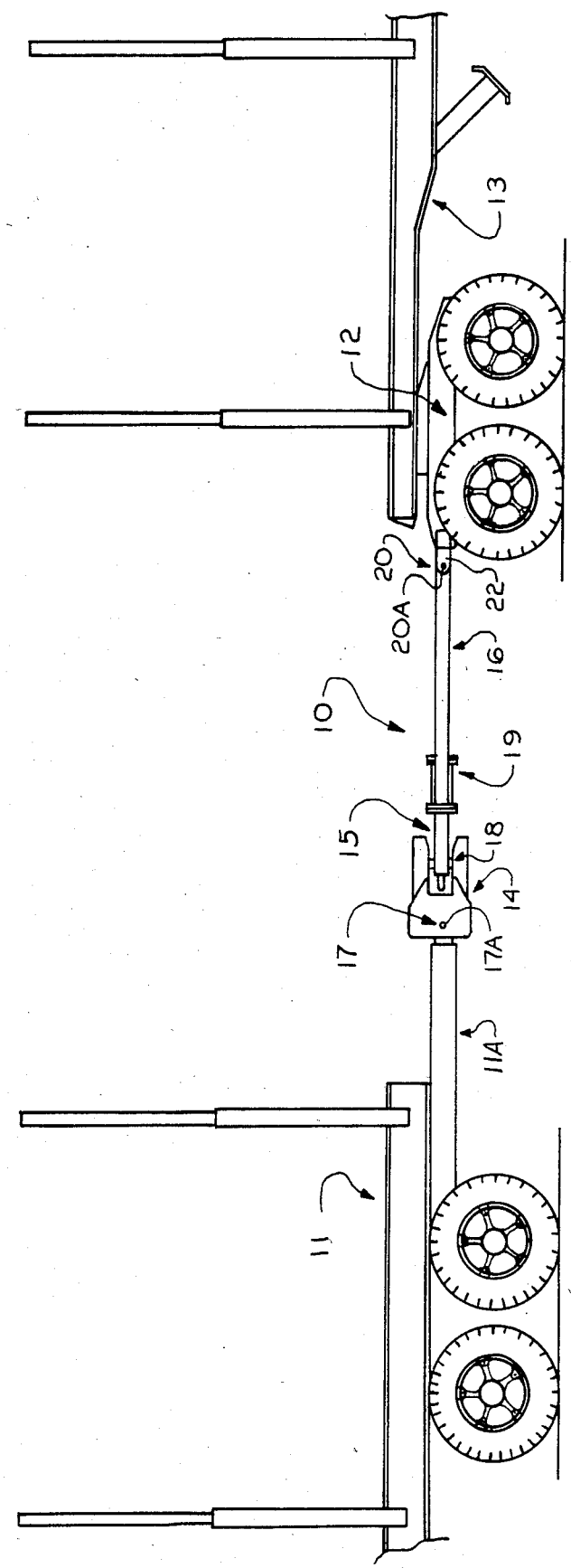
FIG. 1 a fragmentary side view of two trailers and the coupling.

Reference is first made to FIG. 1 wherein a coupling, generally indicated at 10, connects a lead or first trailer 11 to the dolly 12 of a second or rear trailer 13.

The coupling is shown as consisting of a first section 14, a second section 15, and a rear or tow section 16.

The coupling also includes a series of four pivotal connections generally indicated at 17, 18, 19, and 20. Of these, the connection 17 includes a pivot pin 17A and is a transverse pivotal connection between the first section 14 and the first trailer 11 shown by means of a fourth coupling section 11A in the form of a relatively long draw bar welded to the frame of the trailer 11. The trailer 11 may have a member already welded thereto that is capable of being coupled to the first section 14 or of being modified to permit such coupling. In either case, such a member then becomes the fourth section of the coupling 10. It will be appreciated and as will subsequently be apparent that each pivotal connection includes adjacent portions of the sections connected thereby that establish the wanted pivot or turning axes.

The pivotal connection 18 has a vertical pivot axis and connects the first section 14 and the second section 15 and is a fifth wheel unit, subsequently to be detailed. The pivotal connection 19 connects the second section 15 to the tow section 16 and is a unit subsequently to be detailed, permitting the sections 15 and 16 to turn relative to each other to a limited extent on an axis extending lengthwise thereof with such turning usually hereafter referred to as "roll".

The third section 16, see FIGS. 2 and 3, is shown as having eyes 21 spaced apart to enable each to be connected to the appropriate one of the ears 22, see FIG. 1, on the front of the dolly 12 by transverse pivots 20A thereby to establish the fourth pivot connection 20. The third section 16 is shown as having forwardly and inwardly inclined and transversely reinforced side members 23 to the forward ends of which is welded a tubular housing 24 having end flanges 25. The housing 24 is square in cross section and the flanges are shown as square.

The section 15 is of tubular stock that is square in cross section and is so dimensioned that its rear portion 15A extends freely through the housing 24 with an end protruding therefrom which is unable to turn therein beyond a predetermined partial turn. Spaced between each side of the rear portion 15A and the corresponding side of the housing 24 is a resilient member 26, in practice a section of buna N rubber and durometer of which is in the 45-50 range. The rear portion 15A has a flange 27 while a cap 28 bolted to the protruding end of the portion 15A has a flange 29. The flanges 27 and 29 are spaced apart to confine the flanges 25 between them and prevent relative endwise movement between the housing 24 and the rear portion 15A. A layer 30 of Teflon is confined between each flange of the housing 24 and the proximate one of the flanges 27, 29 thus to complete the connection 19. Where the dimensions of the rear portion 15A and of the housing establish a clearance that is too large, the clearance between them may be appropriately limited by means of shims 15B.

It should be noted that an important use of couplings in accordance with the invention is in interconnecting first and second trailers loaded with tree lengths logs. When loaded, the trailers have a high center of gravity and in practice, the connection 19 limits roll in either direction to approximately 10°. While trailers which have, when loaded, a lower center of gravity may be coupled to permit roll to a greater extent, it has been found that a roll of about 10° is adequate even for the most unfavorable road conditions such as those encountered in hauling logs from their harvesting site.

Figure 4:
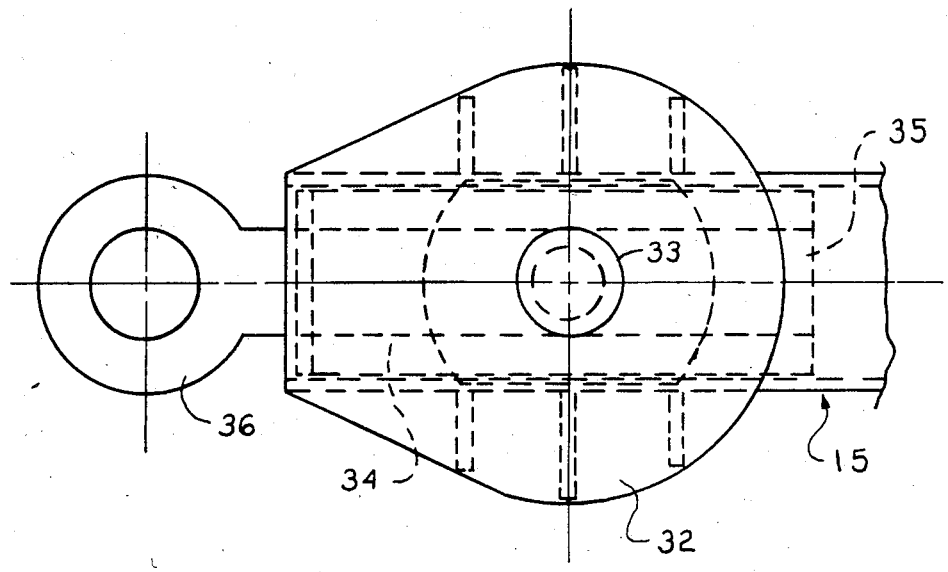
FIG. 4 is a plan view of the double fifth wheel unit.
Figure 5:
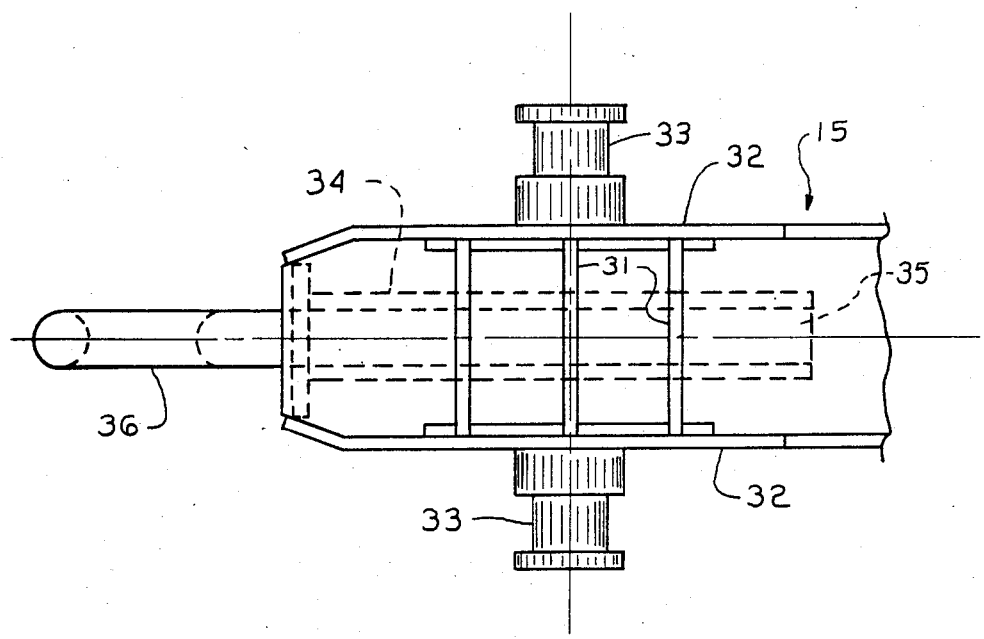
FIG. 5 is a side view thereof.

The forward end of the tubular section 15, see FIGS. 4 and 5, has reinforcements 31 between the margins of upper and lower fifth wheel plates 32 each provided with a king pin 33 with the king pins axially aligned and oppositely disposed. Vertically spaced, lengthwise internal reinforcements 34 have the shank 35 of an eye 36 welded thereto with the eye exposed at the front end of the section 15 to enable the rear trailer 13 to be pulled by means of a chain, not shown, having a hook that can be caught in the eye 36.

Figure 6:
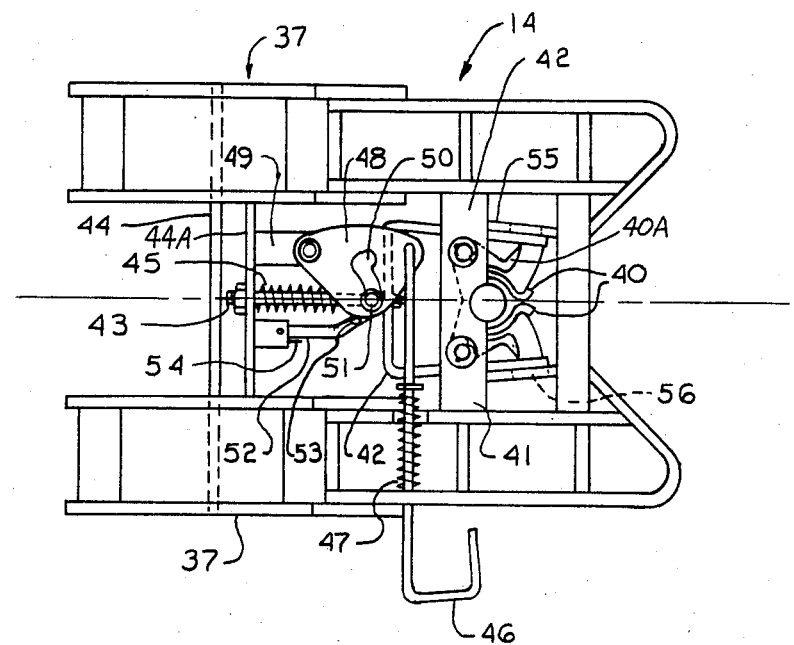
FIG. 6 is a plan view of the fifth wheel unit.
Figure 7:
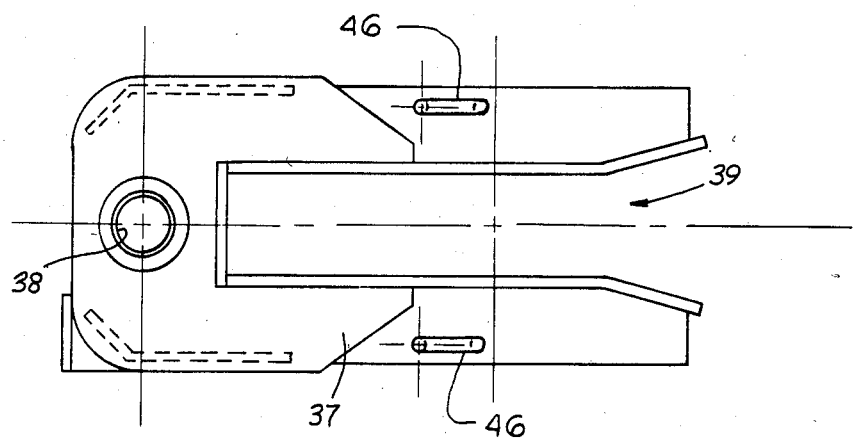
FIG. 7 is a side view thereof.

The first section 14, see FIGS. 6 and 7, consists of a pair of side units 37 interconnected in a spaced apart relationship such as to receive the free end of the coupling section 21 between them. The side units 37 have transversely aligned bores 38 to enable the pivot pin 17A to be extended therethrough and through a bore, not shown, in the received end of the section 21 thereby to establish the pivotable connection 17.

The side units 37 have transversely aligned, rearwardly opening slideways 39 shaped and dimensioned to slidably receive opposite margins of both fifth wheel plates 32 and with the side units 37 supporting between them identical upper and lower locking mechanisms for locking the king pins 33 to the section 14.

The locking mechanisms, in practice, are manufactured by Holland Hitch Co. of Holland, Mich. In FIG. 6, the upper mechanism is shown as having a pair of lock jaws 40 pivotally held by a member 41 interconnecting the side units 37. The jaws 40 are held in their position by a yoke 42 having a shank 43 slidably held by the shoulders 44A a support 44 interconnecting the side units. The shank 43 carries a spring 45 backed by the support 44 and yieldably maintaining the yoke 42 in its forward locking position.

When the king pins 33 of the fifth wheel plates are to be received to be locked to the section 14 or released therefrom, the operator pulls each release handle 46 outwardly against the opposition of a spring 47. Each release handle 46 is pivotally connected to a plate 48 pivotally mounted on a bracket 49 welded to the support 45 and the plate 48 has a cam slot 50 in which there is a cam follower 51 fixed on the shank 43. A secondary lock 52 is pivotally mounted on the support 44 and has a contact pin 53 held in engagement with the margin of the cam plate 49 by a spring 54. The lock 52 is pushed out of locking position by the yoke 42.

The lock jaws 40 are so shaped that they are wedged open by a king pin 33 when a release handle 46 is pulled outwardly, the plate 48 then being turned to force the cam follower 51 and accordingly the yoke 42 forwardly to unload the jaws, either to release a king pin 33 from the section 14 or to admit a king pin 33 that is to be locked thereto. The yoke 42, when in its jaw locking position, has its sides backed by braces 55 which have ports 56 which are uncovered when the yoke 42 is withdrawn from its locking position then to permit the passage through the ports of the jaw portions 40A.

It will be noted that when a coupling is installed, the axis of the connection 17 is a transverse plane inclusive of the roll axis established by the connection 19 and midway between the two fifth wheel plates 30.

I claim:

1. A coupling detachably connecting lead and trailing vehicles, said coupling including first and second rigid sections of which one is a leading section and the other a trailing section, said first section having a first and second aligned end portions of which the first end portion is tubular and rectangular in cross section, a connection between said first end portion and one vehicle, said connection including framework provided with side members having first and second ends, the first ends of said members spaced apart, a transverse pivotal connection between each of said spaced apart ends and said one vehicle, and a lengthwise tubular housing of rectangular cross section between the second ends of said members and welded thereto and provided with exposed end flanges, the tubular end portion of the first section extending freely through said housing and protruding therefrom, said tubular end portion so shaped and dimensioned that the lengthwise angular portions thereof come into binding engagement with flat surfaces of the tubular housing to limit the extent to which the tubular end portion of the first section and the housing can turn relative to each other along the axes thereof to a predetermined maximum, said tubular end portion provided with flanges, one for each housing flange and coacting therewith to prevent lengthwise movement between the housing and said first section, and means connecting the other end portion of said first section to the other vehicle and including two pivotable connections, one having a vertical pivot axis and the other a transverse pivot axis.

2. The coupling of claim 1 in which the side members of the framework of said connection are inclined inwardly towards their second ends, the proximate edges of said other second ends of the side members parallel and of substantially the length of the tubular housing of the connection and welded thereto.

3. The coupling of claim 1 and anti-friction means between the flanges of the tubular housing of the connection and the flanges of the tubular end portion of the first section.

4. The coupling of claim 1 and there is a separate layer of resilient material between each of the corresponding flat surfaces of the tubular housing of the connection and of the tubular end portion of the first section.

5. The coupling of claim 1 or 4 in which the tubular housing of the connection and the tubular end portion of the first section are square in cross section.

6. The coupling of claim 1 in which there are anti-friction members between the flanges of the tubular housing of the connection and of the tubular end portion of the first section, a layer of resilient material is located between each of the corresponding flat surfaces of the tubular housing and the tubular end portion, and the flange on the protruding extremity of the tubular end portion is bolted thereto.

7. The coupling of claim 1 in which the other vehicle has a rigid member protruding from an end thereof, the pivotable connection having the vertical pivot is a fifth wheel connection between the first and second sections and the pivotable connection having the transverse pivot axis is between said rigid member of the other vehicle and the fifth wheel.

* * * * *